United States Patent [19]
Pierik et al.

[11] Patent Number: 5,123,736
[45] Date of Patent: Jun. 23, 1992

[54] METHOD FOR DETERMINING THE MISALIGNMENT IN THE HORIZONTAL PLANE OF ELONGATED PARTS OF A MACHINE, SUCH AS CYLINDERS AND ROLLERS, AND AN OPTICAL REFLECTION INSTRUMENT SUITABLE FOR USE WITH THIS METHOD

[75] Inventors: Johannes A. F. Pierik, Franeker; Wilhelmus J. H. Kerkhofs, Jutryp, both of Netherlands

[73] Assignee: Leotech B.V., Franeker, Netherlands

[21] Appl. No.: 583,431

[22] Filed: Sep. 17, 1990

[30] Foreign Application Priority Data

Sep. 15, 1989 [NL] Netherlands ............ 8902319

[51] Int. Cl.$^5$ ............................................. G01B 11/27
[52] U.S. Cl. ........................................ 356/138; 356/153; 359/872
[58] Field of Search ............... 356/138, 152, 153, 154, 356/155, 373, 375, 399; 350/631–636; 33/228, 286, 657; 359/871–876

[56] References Cited

U.S. PATENT DOCUMENTS

| | | | |
|---|---|---|---|
| 3,726,600 | 4/1973 | Carmack et al. | 356/253 |
| 3,923,402 | 12/1975 | Turcotte | 356/152 |
| 4,298,281 | 11/1981 | Schave | 356/153 |

FOREIGN PATENT DOCUMENTS

7003499 12/1970 Netherlands .
7307071 11/1974 Netherlands .

Primary Examiner—F. L. Evans
Attorney, Agent, or Firm—Young & Thompson

[57] ABSTRACT

A method for determining from optical measurement a measure of the misalignment, i.e. the deviation in the horizontal plane between the actual and the desired position of a rotatable elongated part (9) of a machine (1). Use is made of an imaginary vertical reference plane ($\Sigma$) lying at a distance from the machine (1). The reference plane ($\Sigma$) is determined by two base points (3, 4) which set up an imaginary base line ($\Gamma$) at an angle ($\uparrow$) relative to the longitudinal axis (L) of the machine (1), and by an optically reflecting device (5) disposed such that any cross-section thereof with a horizontal plane is a straight line at right angles to the imaginary reference plane ($\Sigma$). With an optical or electro-optical measuring instrument (7) equipped for angle measurement, and a further optically reflecting device (10) being placed on said machine part (9), the angle ($\phi$) between the line of sight (Z) of the measuring instrument (7) and an arbitrary imaginary line ($\Omega$) forming an angle ($\sigma$) with the imaginary reference plane ($\Sigma$) is measured. With this measured angle ($\phi$) the misalignment of the machine part (9) can be determined. The invention also provides an optical reflecting device (10) for placing on a machine part (9) to be measured.

30 Claims, 7 Drawing Sheets

(Prior Art)

METHOD FOR DETERMINING THE MISALIGNMENT IN THE HORIZONTAL PLANE OF ELONGATED PARTS OF A MACHINE, SUCH AS CYLINDERS AND ROLLERS, AND AN OPTICAL REFLECTION INSTRUMENT SUITABLE FOR USE WITH THIS METHOD

BACKGROUND OF THE INVENTION

The invention relates to a method for determining from optical measurement a numerical measure of the deviation in the horizontal plane between the actual and the desired position of elongated parts of a machine, which parts are disposed rotatably adjacent to each other with their axis at an angle to the longitudinal axis of the machine, using an imaginary vertical reference plane substantially lying at a distance from the machine, which reference plane is determined by two base points lying a distance apart which set up an imaginary base line which is removed from and can be situated at an angle relative to the longitudinal axis of the machine, and by an optically reflecting device having a reflecting surface disposed in such a way that any cross-section thereof with a horizontal plane is a straight line which substantially a right angle with the imaginary reference plane, while an optical measuring instrument is disposed in line with the axis of the machine part concerned, or in line with an imaginary line substantially parallel to said axis, which measuring instrument is taken into a first position in which its optically operative side is directed towards the optically reflecting device, such that the line of sight of the measuring instrument is directed substantially parallel to the imaginary reference plane.

A method of this type is known, inter alia from American Patent Specification U.S. Pat. No. 4,003,133 in the name of the Applicant.

In this known method, in which the measuring instrument is a theodolite, the telescope of viewer thereof is directed from its first position towards the machine part concerned in such a way that the line of sight forms a right angle with the imaginary reference plane. Near one end of the machine part concerned, for example a roller, a measuring tab is placed substantially horizontally and at right angles to the axis of the machine part concerned, or to an imaginary line substantially parallel to said axis, such as, for example, a generating line of the roller surface. By using a plane-parallel plate situated in front of the telescope, the apparent distance between a particular measuring point on the measuring tab and the vertical cross-wire of the telescope is now determined in the direction parallel to the reference plane. The measuring tab is then placed near the other end of the machine part concerned, horizontally and at right angles to the axis, or to the imaginary line substantially parallel thereto, following which the apparent distance between the selected measuring point of the measuring tab and the vertical cross-wire of the telescope is determined again. The difference between the two measured distances is now a measure of the deviation in the horizontal plane between the actual position and the desired position of the machine part concerned. The measuring tab is in practice provided with different measuring points situated at known intervals, because in the case of a relatively large misalignment the distance to the initially selected measuring point can be too great to still be measured with a plane-parallel plate.

In order to be able to determine a measure of the misalignment of a machine part by the known method, a large number of operations still have to be carried out after the measuring instrument is placed in the position in which the line of sight of the telescope is directed substantially at right angles to the imaginary reference plane, and the main disadvantage can be seen in the fact that the measuring tab must be set up both at one end and at the other end of the machine part concerned. In practice, one of the ends of the parts of a machine to be aligned is often difficult or sometimes impossible to reach. If it is remembered that a machine can in practice sometimes be 200 m or even longer, it will be clear that much time and effort can be lost in positioning the measuring tab. For economic reasons it is desirable to take a machine out of operation for as short a time as possible for the alignment of the parts thereof.

SUMMARY OF THE INVENTION

The object of the invention is now in the first instance to improve the known method mentioned in the preamble in such a way that it is no longer necessary to carry out a measurement at both ends of a particular machine part, but that the measurement can be made at any easily reached and readily accessible point of a machine part.

This is achieved according to the invention in that use is made of an optical or electro-optical measuring instrument equipped for angle measurement, a further optically reflecting device having a further reflecting surface being placed on the machine part concerned such that, the further reflecting surface faces the measuring instrument in a first position wherein any cross-section of the further reflecting surface with a horizontal plane sets up a straight line of intersection which crosses or intersects the axis of the machine part concerned, or an imaginary line substantially parallel thereto, at the same included angle, and the measuring instrument is taken into a second position in which the optically operative side thereof is directed towards the further reflecting surface, such that the line of sight forms a substantially right angle with the line of intersection, an angle between the line of sight in the second position of the measuring instrument and an arbitrary imaginary line forming an angle with the imaginary reference plane being measured, by means of which measured angle and one or more of the other angles a numerical measure of the misalignment, i.e. deviation in the horizontal plane between the desired and the actual position, of the machine part concerned can be determined.

Unlike the known method, in which the misalignment of the machine part is determined from a distance measurement, with the method according to the invention the misalignment is determined by angle measurement.

Assuming that the angle between the imaginary base line and the longitudinal axis of the machine and also the included angle of the further optically reflecting surface with the axis of the machine part, or with an imaginary line substantially parallel to said axis, and the angle between the imaginary reference plane and the arbitrary imaginary line relative to which the angle of the line of sight in the second position of the measuring instrument is measured, are known, for example fixed, the misalignment angle between the axis of the machine part concerned and the longitudinal axis of the machine can be determined by means of a simple goniometrical relation with the aid of the known angles and the measured angle. The relative deviation of one end to the other end of the machine part concerned, with respect to its desired position measured transversely to the machine part or parallel to the longitudinal axis of the machines, can then be determined on the basis of this misalignment angle and the length of the machine part concerned.

Because the length of a machine part may be assumed to be known, or is known after being measured once if necessary, in this embodiment of the method according to the invention a single angle measurement suffices, for which the further optically reflecting device can be positioned at an easily accessible place of the machine part concerned. A further advantage of the method according to the invention lies in the fact that, with the current optical, in particular electro-optical, measuring instruments, angle measurements can be carried out more accurately than distance measurements. Compared with the known method, more accurate results can consequently be achieved more easily with the method according to the invention.

It is pointed out that the use of an optically reflecting device to be placed on the machine part to be measured is known per se from the International Patent Application WO-A-8,701,439. In the case of the device and measuring method disclosed therein use is not, however, made of an imaginary reference plane as in the method according to the invention. Several measuring instruments in the form of several pairs of light beam transmitters and receivers are used for determining the misalignment of machine parts.

A simplification of the determination of the abovementioned misalignment angle from the measured angle is obtained in a further embodiment of the method according to the invention through the fact that the imaginary base line is placed substantially parallel to the longitudinal axis of the machine, and the arbitrary imaginary line is selected at substantially right angles or substantially parallel to the imaginary base line, while the further optically reflecting device with its further reflecting surface is placed in such a position on the machine part concerned that the above-mentioned line of intersection crosses or intersects the axis of the machine part concerned, or an imaginary line parallel to said axis, at an included angle which is substantially a right angle.

If the arbitrary imaginary line relative to which the angle of the line of sight in the second position of the measuring instrument is measured lies in the imaginary reference plane, the acute angle between said arbitrary imaginary line and the line of sight is equal to the misalignment angle. If the relevant arbitrary imaginary line is selected at right angles to the reference plane, the acute angle which the line of sight of the measuring instrument in the second position forms with said arbitrary imaginary line is equal to the complement of the misalignment angle. The misalignment direction of the machine part concerned can be determined by a suitable sign agreement from the sign preceding the measured angle.

In this further embodiment of the method according to the invention, for determining the misalignment angle from the measured angle alone it is necessary to position the further reflecting device with its reflecting surface substantially at right angles to the machine part concerned.

In yet a further embodiment of the method according to the invention, this is achieved through the fact that in order to place the further reflecting surface at an included angle which is substantially a right angle on a machine part to be measured, the position or misalignment of a machine part with known position or misalignment is determined by measuring under the assumption of an included right angle, after which the position or misalignment thus determined is compared with the known position or misalignment and, if there is an undesirable deviation, the position of the further reflecting surface is adapted by altering the abovementioned included angle, the steps of measuring, determining, comparing and adapting being repeated until the determined position or misalignment substantially corresponds to the known position or misalignment, in which case the further optically reflecting device with its further reflecting surface is set in such a way that, on placing on a machine part to be measured, the abovementioned line of intersection crosses or intersects the axis thereof or an imaginary line substantially parallel to said axis at an included angle which is substantially a right angle. The known position or misalignment can be determined by, for example, the method known from the above-mentioned American Patent Specification. By setting the reflecting device in this way, the misalignment angle in the horizontal plane of the other parts of the machine can be measured with a desired accuracy.

In yet another embodiment of the method according to the invention, in which the further reflecting surface can be placed at an arbitrary, unknown included angle on the machine part concerned, the further optically reflecting device is placed on the machine part to be measured in a second position rotated about the axis of the machine part concerned relative to the above-mentioned first position, such that the further reflecting surface faces the measuring instrument, and that any cross-section thereof with a horizontal plane sets up a further straight line of intersection which crosses or intersects the axis of the machine part concerned, or an imaginary line substantially parallel thereto, substantially at the same included angle as the angle of the line of intersection in the first position. The measuring instrument is taken into a third position in which the optically operative side thereof is directed towards the further reflecting surface such that the line of sight forms a substantially right angle with the further line of intersection, and a further angle between the line of sight in the third position of the measuring instrument and a further arbitrary imaginary line forming an angle with the imaginary reference plane being measured, with the aid of said angles in the one and the second position of the further reflecting surface and the angle between the base line and the longitudinal axis of the machine, a numerical measure of the misalignment of the machine part concerned can be determined.

It can be demonstrated that the included angle which the one and the further line of intersection of the further reflecting surface in the horizontal position thereof forms with the axis of the machine part concerned, or with an imaginary line substantially parallel to said axis, for example a generating line, can be eliminated from the measured results with the reflecting device. in the first and the second position. Although this embodiment of the method according to the invention requires two measurements on a particular machine part, the time taken in adjusting the further reflecting surface of the further optically reflecting device in this way to the machine part concerned is saved. Both measurements can be carried out at an easily accessible place on the machine part concerned. Inter alia, depending on the distance of the imaginary reference plane from the further reflecting device on the machine part concerned, with a suitable arrangement of the measuring instrument, the two measurements can be carried out from one and the same position thereof. In some cases it will, however, be necessary to move the measuring instrument in the direction along the imaginary base line and if necessary bring the line of sight thereof into line with the imaginary reference plane.

In this case a simplification of the determination of the misalignment angle can again be achieved from the measured angles through the imaginary base line being placed as far as possible parallel to the longitudinal axis of the machine, while the arbitrary imaginary lines relative to which the one and the further angle of the line of sight of the measuring instrument in the third position thereof are measured is selected as far as possible at right angles or as far as possible parallel to the imaginary base line. If the arbitrary imaginary lines are situated in the imaginary reference plane, the misalignment angle is equal to half the sum of the measured acute angles. If the relevant arbitrary imaginary lines are selected at right angles to the reference plane, the complement of the misalignment angle is equal to half the sum of the measured acute angles. Here again, the direction in which the machine part concerned is out of line is determined by a suitable sign agreement from the sign preceding the sum concerned.

For completeness sake, the angle between a line and a plane is defined as the acute angle between said line and its projection perpendicular on said plane. Further, the measurements have not necessarily been carried out in the horizontal plane. By varying the angle of the further reflecting surface with respect to the horizontal plane, the measuring instrument may be positioned at different heights, provided its optical operative side can be directed towards the further reflecting surface. Measurements with the line of sight of the measuring instrument in a horizontal plane are rather exceptional.

If a theodolite is used as the angle measuring instrument, a further optically reflecting device provided with a flat mirror is essentially sufficient for carrying out the method according to the invention. The theodolite is thereby brought into the above-mentioned first, second or third position by autocollimation with the particular optically reflecting surface. In this connection, autocollimation is understood to mean that in the telescope at least the image of the vertical cross-wire coincides with its mirror image coming from the reflecting surface concerned. Preferably, the image of the point of intersection of the horizontal and vertical cross-wires in the telescope coincides with the mirror image thereof.

In order to facilitate the autocollimation of the telescope with the further reflecting device, in case of different heights between said telescope and the reflecting device, in an embodiment of the method according to the invention a further optically reflecting device is placed on the machine part concerned, having a roof-shaped further reflecting surface made up of two flat reflecting surfaces standing at an aperture angle to each other and intersecting each other along a straight line. With the use of a measuring instrument comprising a (laser) light beam transmitter and receiver disposed above or below each other at its optically working side, as disclosed, for example, by U.S. Pat. No. 4,709,485 or the International Patent Application WO-A-8,404,960, the use of a further reflecting device in the form of a so-called "roof mirror" is necessary.

If the further optically reflecting surface is a flat mirror, for example, the above-mentioned condition concerning the placing thereof on a machine part concerned such that any cross-section thereof with a horizontal plane sets up said one or further straight line of intersection which crosses or intersects the axis of the machine part concerned, or an imaginary line substantially parallel to said axis, at the same included angle, is automatically met. However, if an optically reflecting device having a roof-shaped further reflecting surface is used, the determination of the horizontal position of the abovementioned line of intersection of said two flat reflecting surfaces is vitally important, because in this position any cross-section of said further reflecting surface with a horizontal plane sets up a straight line of intersection which crosses or intersects the axis of the machine part concerned, or an imaginary line substantially parallel to said axis, at the same included angle.

According to an embodiment of the method according to the invention, this can be achieved in that, in order to take the further reflecting surface into the position facing the measuring instrument, in which any cross-section thereof with a horizontal plane sets up a straight line of intersection which crosses or intersects the axis of the machine part concerned, or an imaginary line substantially parallel to said axis, at the same included angle, the further optically reflecting device is brought with its straight line into a position which is substantially horizontal, using a precision levelling instrument.

The method in which measurements are carried out with the further optically reflecting device in the first position and the second position rotated through 200 gon (decimal degree system) relative thereto has the advantage that the misalignment of rotating machine parts can also be determined therewith, for which purpose, according to an embodiment of the method according to the invention, the further optically reflecting device is fixed on the machine part concerned with its reflecting surface facing the imaginary reference plane.

Measuring on rotating machine parts is very profitable from the economic point of view, because it means that the period which a machine is at a standstill for the alignment of the machine parts can be shortened by at least the time taken for measuring the misalignment. Measuring on rotating machine parts also gives greater freedom in the time at which the misalignment measurement can be carried out.

In a special embodiment of the method according to the invention, suitable for determining the misalignment of rotating machine parts using a theodolite as the measuring instrument, the further optically reflecting device is provided with a roof-shaped further reflecting surface, made up of two flat reflecting surfaces standing at an aperture angle to each other and intersecting each other along a straight line, and, through rotation of the machine part concerned, the further optically reflecting device is taken into the above-mentioned one and further position, in which any cross-section of the further reflecting surface with a horizontal plane sets up a straight line of intersection, and the measuring instrument is brought into the above-mentioned second and third positions by autocollimation with the further reflecting surface, in which positions the above-mentioned first or second position of the further optically reflecting device is determined with the aid of the uninterrupted reflected image of the vertical cross-wire of the telescope coming from the further reflecting surface.

The accuracy of the measurement can be improved by determining the angles to be measured for determining a numerical measure of the misalignment of the machine part concerned from the average of several partial measurements.

The invention also relates to an optical reflection instrument suitable for use with the method according to the invention, which optical reflection instrument is made up of a carrier element, means for placing the carrier element on a part of a machine to be measured, an optically reflecting device which is disposed movably on the carrier element and having a reflecting surface, and means for adjusting the position of the reflecting device.

In order to be able to set the angle of the reflecting surface of the optically reflecting device with the axis of a machine part, for example a roller, or an imaginary line substantially parallel to said axis, for example a generating line of the roller surface, in a further embodiment of the optically reflecting instrument according to the invention the carrier element is provided with projecting legs, for placing on a machine part to be measured, at least one of the legs is made displaceable in the direction relative to the carrier element.

For accurate placing of the optical reflection instrument on a machine part, for example at right angles, in yet another embodiment thereof the carrier element is elongated in shape, preferably made of ceramic material and having at least one flat face, near and along a long edge of which a projection is provided.

For positioning of the reflecting device in such a way that any cross-section of the reflecting surface with a horizontal plane sets up a straight line of intersection which crosses or intersects the axis of the machine part concerned, or an imaginary line substantially parallel to said axis, at the same included angle, in an embodiment of the optical reflection instrument according to the invention a support extends from a face of the carrier element, having a rotatable shaft on which the optically reflecting device is fixed, while the means for adjusting the optically reflecting device into a desired position further comprise an annular element to be fixed on the shaft and provided with a lip projecting outwards relative to its periphery, while the support is provided with two opposite lobes projecting in the same direction, in such a way that in the fitted state the lip of the annular element lies between the two lobes of the support, which two lobes are provided with means for varying the distance of the lip from the two lobes.

In yet a further embodiment of the optical reflection instrument according to the invention the optically reflecting device is provided with a roof-shaped reflecting surface, made up of two flat reflecting surfaces which stand at an aperture angle to each other, and intersecting each other along a straight line. If a theodolite is used as the measuring instrument, such a roof mirror facilitates the setting of the telescope of the measuring instrument by autocollimation.

In contrast to a single flat mirror if, for example, a roof-shaped reflecting surface is used, said reflecting surface can be brought into the position facing the measuring instrument in which any cross-section with a horizontal plane sets up a straight line of intersection which crosses or intersects the axis of the machine part concerned, or an imaginary line substantially parallel to said axis, at the same included angle, by bringing the line of intersection of its two flat reflecting surfaces in the horizontal position.

In an embodiment of the optical reflection instrument according to the invention, the optically reflecting device is made up of a holder on which the reflecting surface is mounted, said holder is provided with a levelling instrument. The levelling instrument is preferably a precision levelling instrument.

As already mentioned above, the determination of the misalignment of a machine part through angle measurement according to the invention can also be carried out on rotating machine parts. The invention consequently also relates to an elongated machine part such as a cylinder or roller, characterized in that at least one optically reflecting device is fixed on one or both end faces thereof. The optically reflecting device is preferably provided with a roof-shaped reflecting surface, made up of two flat reflecting surfaces which stand at an aperture angle to each other and which intersect each other along a straight line. They can be either individual mirrors or, preferably, a prism of which two surfaces are made reflecting.

The invention also relates to an elongated machine part having means for detecting the position in which the straight line of the roof-shaped reflecting surface is in the horizontal position. These means can be either optical or electronic.

The invention also includes a machine having one or more elongated parts such as cylinders or rollers, which are provided having at least one optically reflecting device, for example with a roof-shaped reflecting surface and, if necessary, with means for detecting the horizontal position thereof.

Although in the above, a coordinate system in terms of horizontal and vertical directions is always assumed, it will be understood that the method according to the invention can also be used in other coordinate systems.

The invention is explained below in greater detail with reference to the attached drawings.

DETAILED DESCRIPTION OF THE EMBODIMENTS

Figure 1:
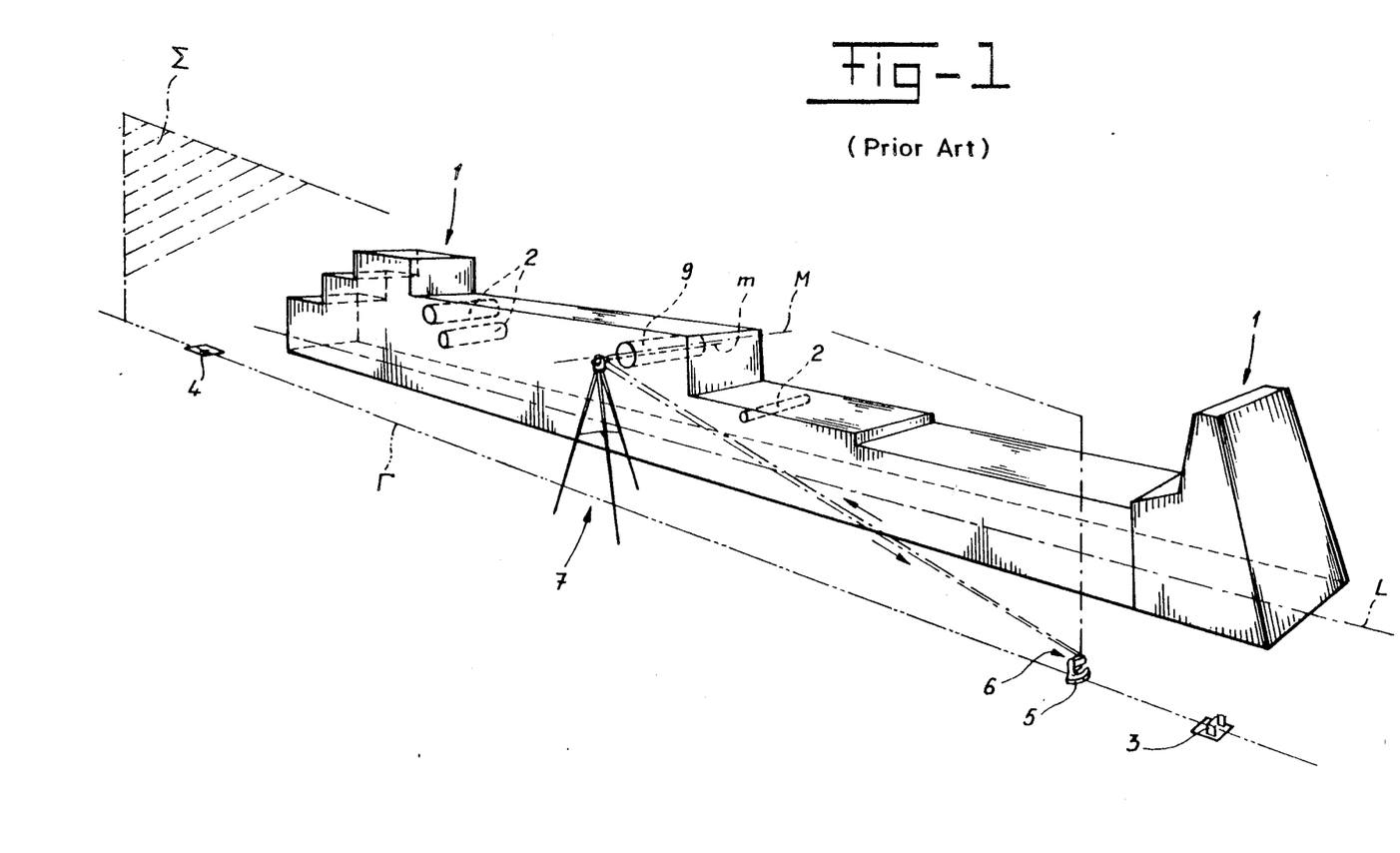
FIG. 1 shows schematically in perspective a machine with machine parts to be aligned.

In FIG. 1 reference number 1 indicates a machine whose parts 2, in this case rollers, must be aligned in such a way that they come to lie substantially parallel to each other and at right angles to the longitudinal axis L, indicated by a dashed and dotted line, of the machine 1. However, in practice machines are also found in which the parts 2 must be directed at an angle relative to the longitudinal axis L. The machine 1 can be, for example, a machine for paper preparation set up in a machine shop. Outside the machine 1, on the floor of the machine shop, two base points 3, 4, which set up an imaginary base line Γ, shown in FIG. 1 by a dashed and double dotted line, are marked on the floor of the machine shop. The base points 3, 4 are preferably made with as great as possible a distance between them, which can already be carried out, for example, when the machine 1 is being installed.

On the imaginary base line Γ an optically reflecting device 5 with a reflecting surface 6 is set up in such a way that any cross-section thereof with a horizontal plane is a straight line which crosses or intersects the base line Γ substantially, a right angle. The reflecting surface 6 now defines an imaginary reference plane Σ, which is shown partially in FIG. 1 hatched with dashed lines, and of which the imaginary base line Γ forms part. It will be clear that the reflecting surface 6, depending on its width in the direction at right angles to the imaginary base line Γ, defines a collection of parallel imaginary reference planes Σ.

The reflecting surface 6 can be an ordinary flat mirror, but is preferably a roof-shaped reflecting surface, made up of two flat reflecting surfaces which stand at an aperture angle of, for example, 30 gon to 130 gon (decimal degree system) to each other and intersect each other along a straight line. Such a roof-shaped reflecting surface 6 defines a more extended imaginary reference plane Σ than a single flat mirror of the same dimensions. Once set up, a reflecting device 5 can be used essentially for the alignment of all parts 2 of the machine 1. The reflecting device 5 can be made fixed or detachable, and if desired portable. In the last-mentioned case it must then be set up anew each time for carrying out a measurement on a machine.

The setting-up of the reflecting device 5 can be, for example, carried out in such a way that an optical or electro-optical measuring instrument such as a theodolite is set up above the base point 4. Such a theodolite is generally made up of a stand with a telescope or viewer disposed movably thereon and provided with a horizontal and vertical cross-wire. Measuring instruments of this type are known per se in practice and need no further explanation. The reflecting device 5 is now adjusted in such a way that in the telescope the image of the vertical cross-wire and the mirror image thereof from the reflecting surface 6 coincide. In this position the reflecting surface 6 defines an imaginary reference plane Σ, as desired. For carrying out the measurements on the parts 2 of the machine 1, the reflecting device 5 with its reflecting surface 6 is fixed in this position.

Let us now look at the situation in which a machine part 9 with its longitudinal axis M, also indicated by a dashed and dotted line, must be directed at right angles to the longitudinal axis L of the machine 1. For determining the misalignment of the machine part concerned according to the technique of the state of the art disclosed by U.S. Pat. No. 4,003,133, an optical measuring instrument 7 in the form of a theodolite is set up in line with the axis M or an imaginary line m substantially parallel to said axis which, for example in the case of a roller, can be a generating line of the roller surface. All this is shown schematically in FIG. 2 in the horizontal plane, on an enlarged scale relative to FIG. 1.

Figure 2:
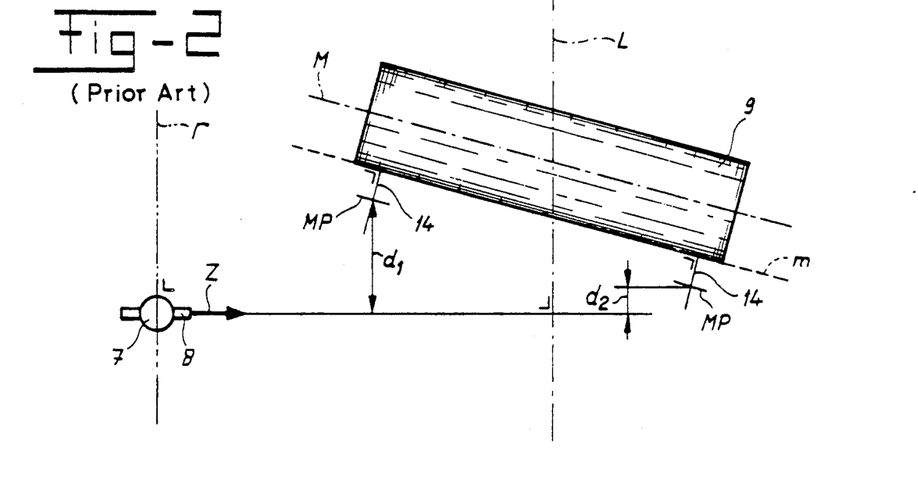
FIG. 2 illustrates schematically in the horizontal plane the known method for determining the misalignment of a machine part by distance measurement.

For the sake of simplicity, the imaginary base line Γ is for the time being selected so that it is parallel to the longitudinal axis L of the machine. In the first instance, the measuring instrument 7, in this case a theodolite, is directed with its optically operative side 8, i.e. the telescope thereof, facing the optically reflecting device 5, the line of sight Z of the telescope being directed substantially parallel to the imaginary base line Γ or the imaginary reference plane Σ. From this first position I the telescope is rotated with its line of sight Z towards the machine part concerned, in such a way that it forms an angle which is substantially right angle with the imaginary base line Γ or the imaginary reference plane Σ.

A measuring tab 14 is then placed on the machine part 9 concerned at one end thereof, substantially horizontally and at right angles to the axis M thereof, and provided with one or more measuring points lying at known intervals. With the aid of a plane-parallel plate (not shown) fitted in front of the telescope, the apparent distance $d_1$ in the direction parallel to the imaginary base line Γ between a specific measuring point MP on the measuring tab and the line of sight Z, i.e. the vertical cross-wire of the telescope is determined. The measuring tab 14 is then placed near the other end of the machine part 9 concerned and in the same way the distance $d_2$ between said selected measuring point MP of the measuring tab 14 and the line of sight Z of the telescope is determined. The difference between the two measured distances $d_1$ and $d_2$ is a measure of the misalignement of the machine part 9 concerned. The misalignment measurement according to the state of the art is thus a distance measurement in the horizontal plane.

Figure 3:
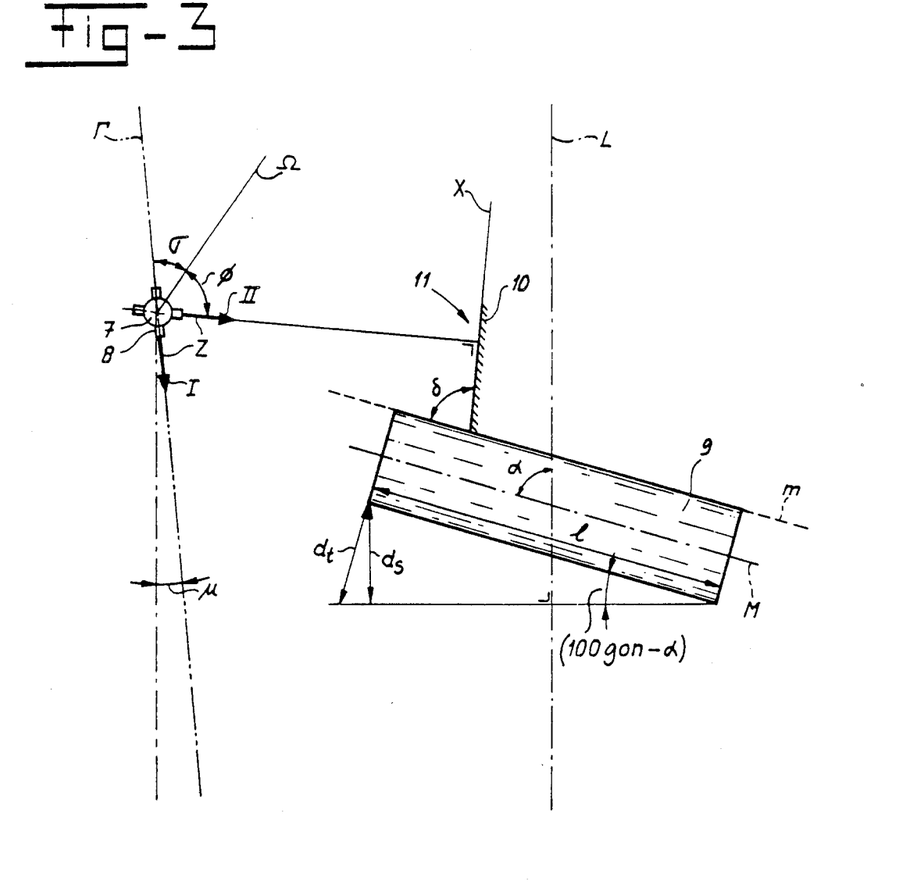
FIG. 3 illustrates schematically in the horizontal plane an embodiment of the method according to the invention for determining the misalignment of a machine part by angle measurement.

FIG. 3 shows schematically, in the horizontal plane, an embodiment of the method according to the invention, in which the misalignment of a particular machine part 9 is determined by angle measurement. As the point of departure the most general situation is taken, in which the imaginary base line Γ forms an angle μ with the longitudinal axis L of the machine.

For determining the misalignment angle α, which in the present case means the acute angle between the axis M of the machine part 9 concerned and the longitudinal axis L of the machine, in the method according to the invention a further optically reflecting device 10 with a further reflecting surface 11 is placed on the machine part 9 concerned. This further optically reflecting device 10 is placed with its further reflecting surface 11 in such a position that any cross-section of the further reflecting surface 11 with a horizontal plane sets up a straight line of intersection X which crosses or intersects the axis M of the machine part 9 concerned or, for example, a generating line m of the surface of the machine part 9 concerned, substantially parallel to the axis M, at the same included angle δ.

If the further optically reflecting device 10 has a flat reflecting surface 11, the abovementioned condition concerning the line of intersection X is automatically met. If, however, the further optically reflecting device 10 has a roof-shaped reflecting surface 11, comprising two reflecting surfaces 12 standing at an aperture angle γ relative to each other and intersecting each other along a straight line s, as shown schematically in perspective in FIG. 4, the requirement concerning the line of intersection X is met only if the straight line s lies in the horizontal plane. Such a roof-shaped reflecting surface 11 can be brought with its abovementioned straight line s in the desired horizontal position using, for example, a precision levelling instrument.

The measuring instrument 7 is now taken into a first position I, in which the line of sight Z of the measuring instrument 7 is directed as far as possible parallel to the imaginary base line Γ, or the imaginary reference plane Σ. The measuring instrument 7 is then taken into a second position II, in which its optically operative side 8 is directed towards the further reflecting surface 11, and the line of sight Z forms an angle which is substantially a right angle with the above-mentioned line of intersection X. For determining the misalignment angle α it is now important to know the angle between the line of sight Z of the measuring instrument 7 in the first position I and second position II. In the most general form this angle can be determined by measuring the angle φ which the line of sight Z forms in the second position II with an arbitrary imaginary line Ω which in turn forms an angle σ with the imaginary reference plane Σ.

Below, on the basis of the decimal degree system, indicates as gon, it can be demonstrated simply that the absolute value of the misalignment angle α is equal to:

$$|\alpha| = |100 \text{ gon} - \phi + \mu - \sigma + \delta| \quad (1)$$

in which the vertical lines are used as an indication of the absolute value. If the angles $\mu$, $\sigma$ and $\delta$ are known, the misalignment angle α can be calculated from this relation (1).

Assuming that the imaginary base line Γ lies substantially parallel to the longitudinal axis L of the machine, i.e. angle $\mu = 0$ gon, while the arbitrary imaginary line Ω lies substantially at right angles to the imaginary reference plane Σ, i.e. $\sigma = 100$ gon, if the further optically reflecting device 10 with its reflecting surface 11 is placed on the machine part 9 concerned in such a way that the abovementioned line of intersection X crosses or intersects the axis M of the machine part concerned, or an imaginary line m parallel thereto, at an included, substantially, right angle $\delta = 100$ gon, the complement of the misalignment angle is equal to the measured acute angle φ between the arbitrary imaginary line Ω and the line of sight Z of the measuring instrument 7 in the second position II thereof. Thus:

$$|100 \text{ gon} - \alpha| = |\phi| \quad (2)$$

when: $\mu = 0$ gon; $\delta = 100$ gon and $\sigma = 100$ gon.

If the particular arbitrary imaginary line Ω lies in the imaginary reference plane Σ, i.e. $\sigma = 200$ gon, on condition that $\mu = 0$ gon and $\delta = 100$ gon, the value of the misalignment angle α is equal to the acute angle between the arbitrary imaginary line Ω and the line of sight Z, thus $$|\alpha| = |\phi| \quad (3)$$

It will be clear that the situation with the arbitrary imaginary line Ω lying in the imaginary reference plane Σ corresponds to the measuring instrument in the first position I. The situation in which the arbitrary imaginary line Ω forms a right angle with the imaginary reference plane Σ corresponds, of course, to rotating the line of sight Z of the measuring instrument through 100 gon. Both positions can be determined unequivocally.

If the misalignment angle α is known, the length l of the machine part 9 concerned, can be used to determine the displacement $d_a$ in the horizontal plane in the direction along the longitudinal axis L of the machine, or the displacement $d_t$ in the horizontal plane at right angles to the axis M of the machine part concerned. The following applies:

$d_a = l \sin \alpha$, and $$d_t = l \text{ tg } \alpha \quad (4)$$

It can thus be seen from the above that the misalignment of a machine part can be determined by a single angle measurement, namely measuring the angle φ, and making a simple goniometric calculation. It will be understood that the necessary goniometric calculations can be carried out automatically, for example using a microprocessor.

If the included angle δ between the line of intersection X and the axis M of the machine part concerned, or an imaginary line m substantially parallel thereto, is not known, it can be determined by measuring on a machine part with known position or misalignment. The known position or misalignment can, if necessary, be determined by the known method, as described with reference to FIG. 2. By comparing the results obtained with the measurement according to the invention and the known position or misalignment, the included angle δ can be determined or the position of the further optically reflecting device 10 can be adapted in such a way that the above-mentioned included angle is a right angle, i.e. 100 gon.

Figures 4, 5:
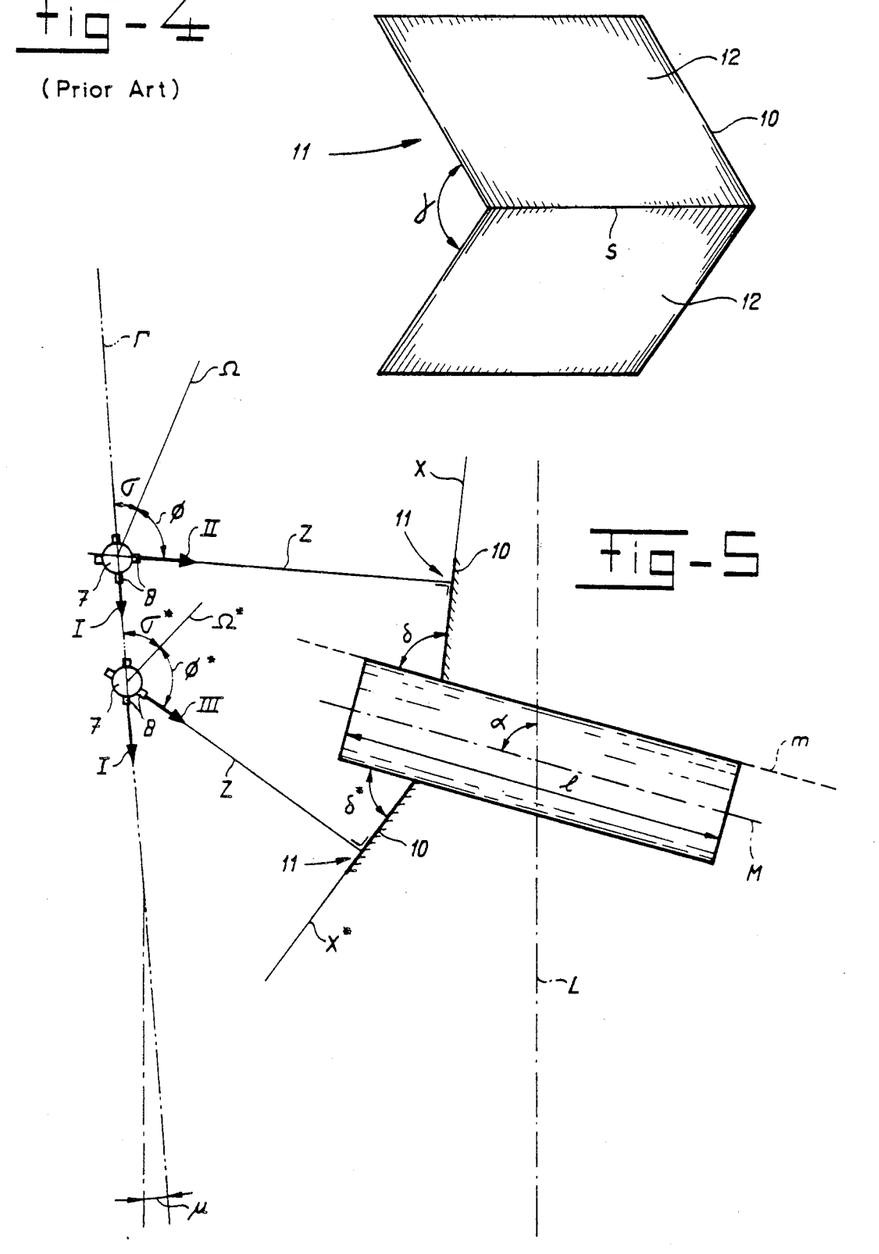
FIG. 4 shows schematically in perspective a roof-shaped reflecting device.
FIG. 5 illustrates schematically in the horizontal plane a further embodiment of the method according to the invention.

FIG. 5 shows schematically a further embodiment of the method according to the invention, in which it is no longer necessary to know, for example, the included angle δ. In this case two individual measurements have to be carried out on the same machine part, but in practice this need not be a disadvantage because the further optically reflecting device 10 can be positioned here at a readily accessible place on the machine part concerned.

In addition to the angle measurement described above, a second, similar angle measurement is also carried out, but in this case the further optically reflecting device 10 is brought into a second position rotated relative to the first measurement through 200 gon about the axis M of the machine part 9 concerned. The position on the machine part concerned, is not stipulated here. What is important is that in this rotated second position any cross-section of the further reflecting surface 11 with a horizontal plane sets up a further straight line of intersection X* which crosses or intersects the axis M of the machine part 9 concerned, or a line m substantially parallel to said axis, for example a generating line m of the surface, at a same included further angle δ* substantially equal to the angle δ of the line of intersection X in the first measurement.

The measuring instrument 7 is now taken into a third position III, in which its optically operative side 8 is directed towards the further reflecting surface 11, and the line of sight Z forms an angle which is substantially a right angle φ* with the further line of intersection X*. By measuring the angle between the line of sight Z of the measuring instrument 7 in this third position III and a further arbitrary imaginary line $\Omega^*$ forming an angle $\sigma^*$ relative to the imaginary reference plane $\Sigma$, the size of the misalignment angle $\alpha$ can be determined from:

$$|\alpha| = |300 \text{ gon} - \phi^* + \mu - \sigma^* - \delta^* -| \quad (5)$$

Under the assumption $|\delta| = |\sigma^*|$, summation of (1) and (5) leads to:

$$2|\alpha| = |(200 \text{ gon} - \phi) + (200 \text{ gon} - \phi^*) 2\mu - (\sigma + \sigma^*)| \quad (6)$$

If the angles $\mu$, $\sigma$ and $\sigma^*$ are known, the misalignment angle $\alpha$ can be calculated from (6), using the measured angles $\phi$ and $\phi^*$.

If the imaginary reference plane $\Sigma$, or the imaginary base line $\Gamma$, is selected parallel to the longitudinal axis L of the machine, i.e. $\mu=0$ gon, and if the arbitrary imaginary lines $\Omega$ and $\Omega^*$ relative to which the angles $\phi$ and $\phi^*$ are measured lie in the imaginary reference plane $\Sigma$, thus $\sigma=\sigma^* =200$ gon, the misalignment angle $\alpha$ is equal in size to half the sum of the measured acute angles $\phi$ and $\phi^*$. If the arbitrary imaginary lines $\Omega$ and $\Omega^*$ concerned are selected at right angles to the imaginary reference plane $\Sigma$, in other words, $\sigma=\sigma^* =300$ gon, it follows that the complement of the misalignment angle is equal to half the sum of the measured acute angles $\phi$ and $\phi^*$.

By a suitable sign agreement, the direction in which the machine part 9 concerned is out of line can be determined from the sign preceding the sum concerned.

It will be clear that the angle $\mu$, for example, can also be eliminated from the equations (1) and (5), but then the included angles $\delta$ and $\delta^*$ must be known, for example each 100 gon. In this case, the misalignment angle $\alpha$ of the machine part concerned can also be calculated from the double angle measurement if the angular position of the imaginary reference plane $\Sigma$ relative to the longitudinal axis L of the machine is unknown.

In the double angle measurement described with reference to FIG. 5 it is assumed that the measuring instrument 7 must be set up at two different positions, the measuring instrument 7 having to be adjusted by always taking it into the above-mentioned first position I. This need not, however, always be necessary. Depending on the distance of the measuring instrument 7 from the machine part concerned, or the further optically reflecting device 10 placed thereon, and the dimensions thereof, it is possible in some cases to measure from one and the same position of the measuring instrument 7. In a similar way to that described with reference to FIG. 3, it is possible by means of equation (4) to calculate the misalignment in the horizontal plane, i.e. the distances $d_a$ and $d_f$ from the length of the machine part concerned and the misalignment angle determined.

Figure 6A:
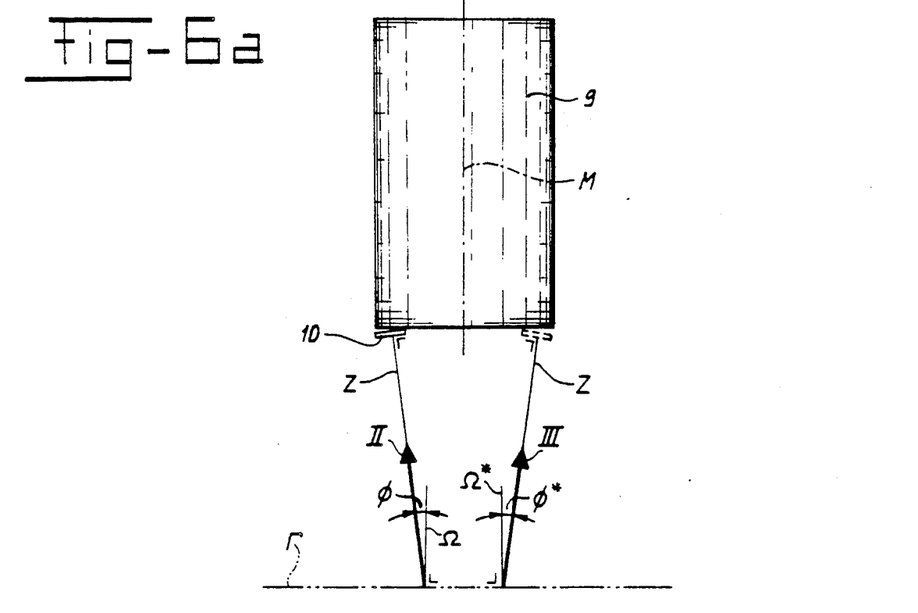
FIGS. 6a, 6b illustrate schematically in the horizontal plane a measurement on a rotating machine part.
Figure 6B:
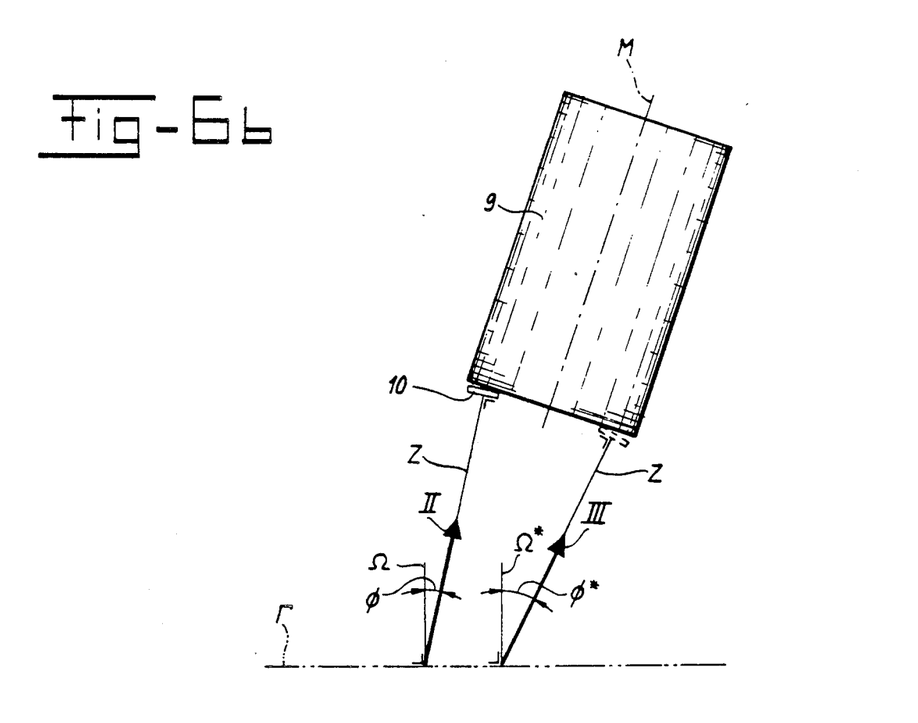

The double angle measurement is particularly suitable for measuring on rotating machine parts, as shown schematically in FIGS. 6a and 6b.

Fixed at one end of the machine part 9 concerned, on the end face thereof, is a further optically reflecting device 10, of which the reflecting surface faces in the direction towards the imaginary reference plane $\Sigma$ or the imaginary base line $\Gamma$. For the sake of simplicity, it is assumed in FIG. 6 that the imaginary reference plane $\Sigma$ runs parallel to the longitudinal axis L of the machine, and that the arbitrary imaginary lines $\Omega$ and $\Omega^*$ lie at right angles to the reference plane, as shown.

If the machine part 9 concerned lies with its axis M at right angles to the longitudinal axis L of the machine, the two measured angles $\phi$ and $\phi^*$ in the second position II and third position III respectively of the measuring instrument 7 will be equal in size, as illustrated in FIG. 6a. Where a machine part is out of line, the relevant angles $\phi$ and $\phi^*$ will, however, be different, as shown in FIG. 6b. The misalignment angle $\alpha$ of the machine part concerned can then again be calculated from the measured angles $\phi$ and $\phi^*$, as described in the above with reference to FIG. 5.

The two measurements must be carried out when the further optically reflecting device 10 is in the position in which any cross-section of the further reflecting surface 11 thereof with a horizontal plane sets up a straight line of intersection X or X* which crosses or intersects the axis M of the machine part 9 concerned, or an imaginary line m which is substantially parallel to said axis, at the same included angle $\delta$ or $\delta^*$. Instead of a single optically reflecting device 10, two or more optically reflecting devices 10 can be fixed on the machine part concerned, if necessary. On account of accuracy requirements, in operating conditions it is preferable to use a single further optically reflecting device 10.

The method according to the invention can be carried out either with an optical or electro-optical measuring instrument in the form of a theodolite, or with a measuring instrument equipped with a light beam transmitter and receiver, in particular laser light. Where a theodolite with a telescope provided with cross-wires is used, the telescope with its line of sight Z is taken into the above-mentioned second position II and if necessary third position III by autocollimation of the vertical cross-wire with the further optically reflecting surface 11. Autocollimation is understood to mean that in the telescope the image of the vertical cross-wire coincides with the reflected image thereof received from the further optically reflecting surface 11. The further reflecting surface 11 can be an ordinary flat mirror, but it is preferably a roof-shaped reflecting surface 11, comprising two flat reflecting surfaces 12 with an aperture angle $\gamma$ of, for example, 30 gon to 130 gon (see FIG. 4).

With the use of a measuring instrument comprising a light beam transmitter and receiver disposed above each other, the further optically reflecting device 10 must have a roof-shaped reflecting surface 11, with an aperture angle $\gamma=100$ gon. This because the light beam from the further optically reflecting device 10 to the receiver is reflected parallel to the transmitted light beam. Such light beam transmitter/receiver combinations, like optical or electro-optical theodolites, are available commercially. Certain embodiments of laser light beam transmitter/receiver combinations have a processing unit which can indicate the angle which the reflected light beam forms with the transmitted light beam. The half angle difference determines the position in which the line of sight Z of the measuring instrument forms a right angle with the reflecting surface concerned. This is important for determining, by the method according to the invention, the above-mentioned second position II and, if necessary, third position III of the measuring instrument.

With the use of a further optically reflecting device 10 with a roof-shaped reflecting surface 11 the position in which any cross-section of the reflecting surface 11 with a horizontal plane sets up a straight line of intersection X or X* is obtained if the line of intersection s under which the individual flat reflecting surfaces 12 of such a roof-shaped reflecting surface 11 intersect each other lies horizontally. In the case of measurement on stationary machines, this position can be adjusted by means of a precision levelling instrument. In the case of rotating machines provided with a fixed further optically reflecting device 10 with a roof-shaped reflecting surface 11, the horizontal position thereof, in other words the position in which the straight line s lies horizontally, can be indicated, for example, with separate optical or electronic means.

With the use of a theodolite as the measuring instrument, the above-mentioned horizontal position can be determined by means of the uninterrupted reflected image of the vertical cross-wire from the further reflecting surface 11. With the use of a light beam transmitter/receiver combination, the horizontal position of a roof-shaped reflecting surface can be established by means of the absence of an angle difference between the transmitted and reflected beam in the vertical direction.

In particular, in the case of measurements on rotating machines using a theodolite, the accuracy of the measurement can be improved by determining a numeric measure of the misalignment of the machine part concerned from several partial measurements.

Figure 7A:
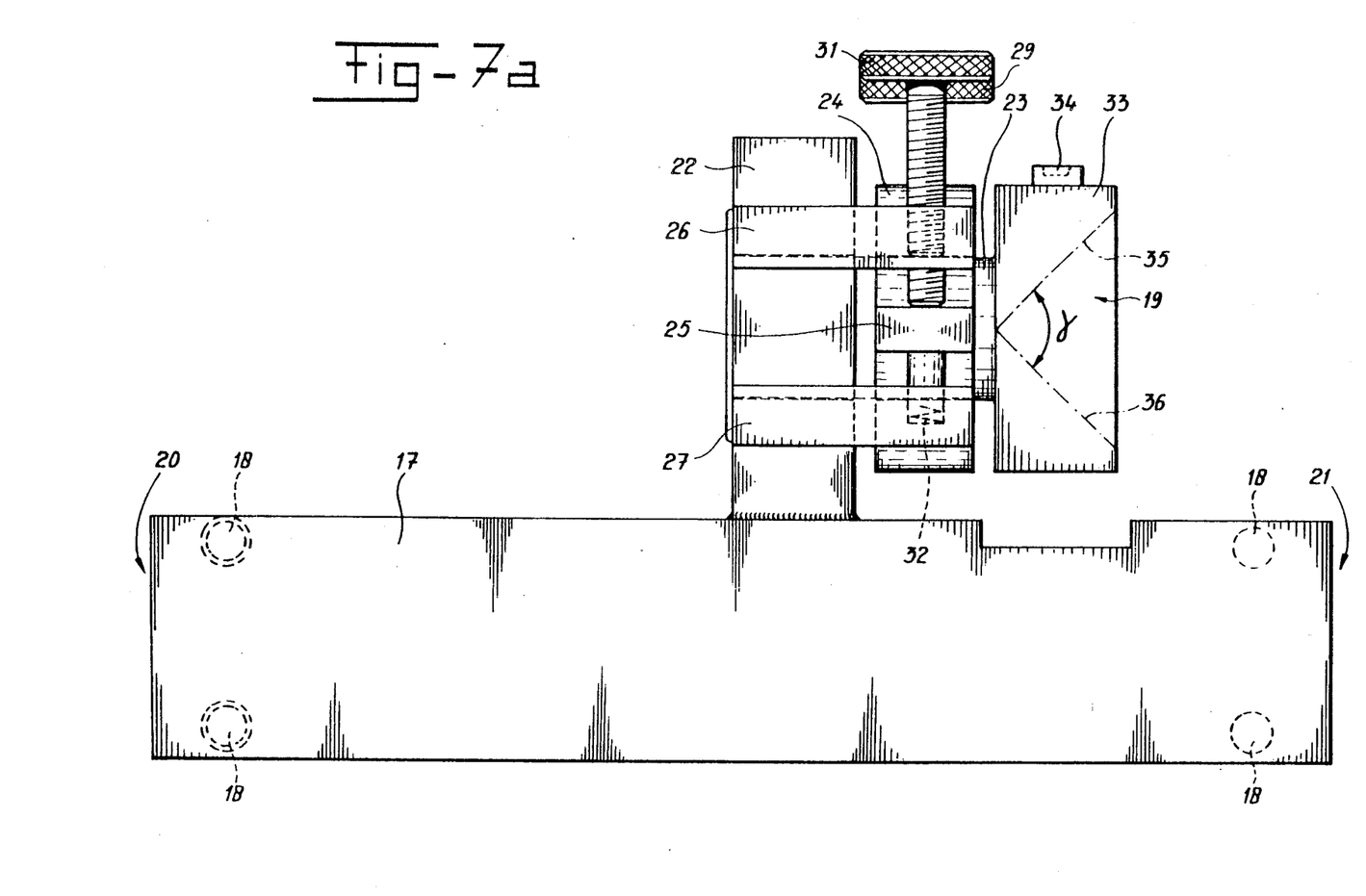
FIGS. 7a, 7b, 7c show schematically a front, top and side view respectively of an embodiment of an optical reflection instrument suitable for use with the method according to the invention.
Figure 7B:
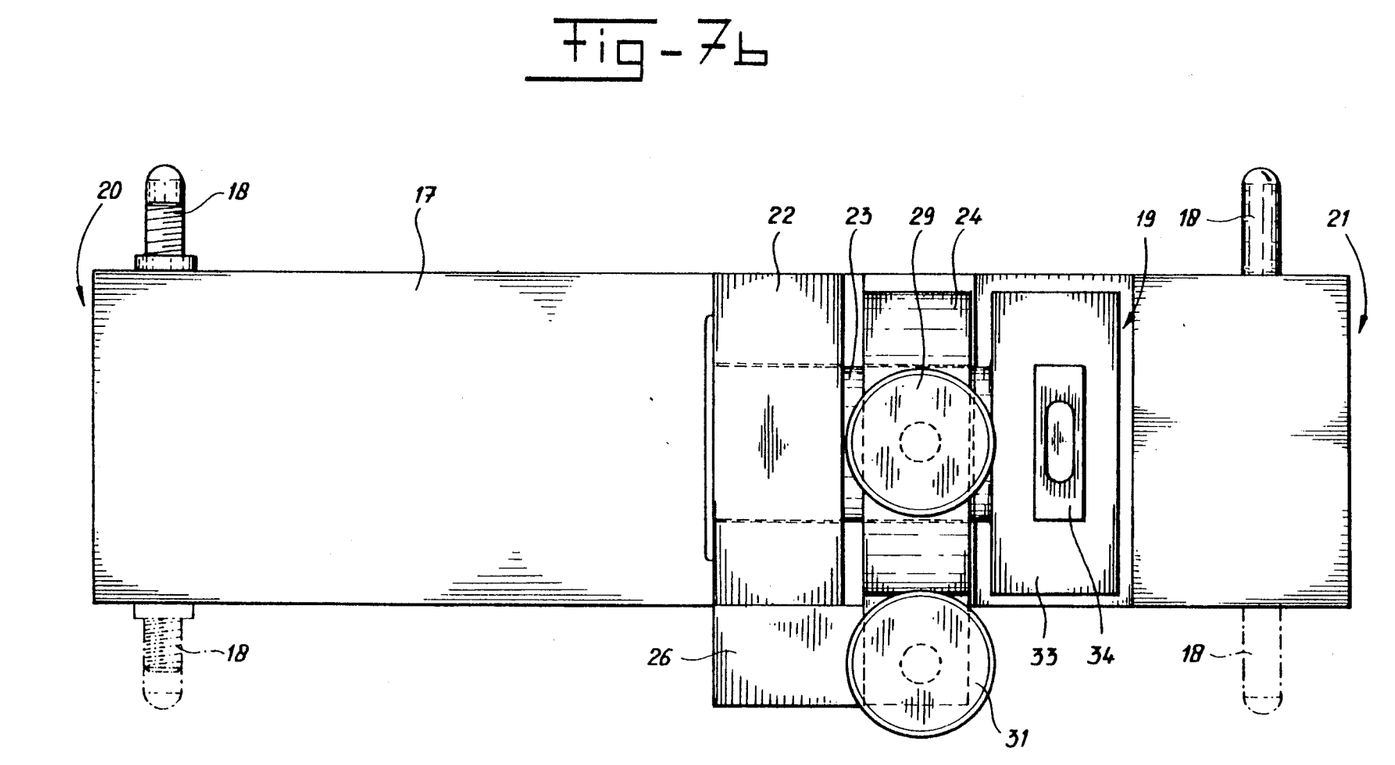
Figure 7C:
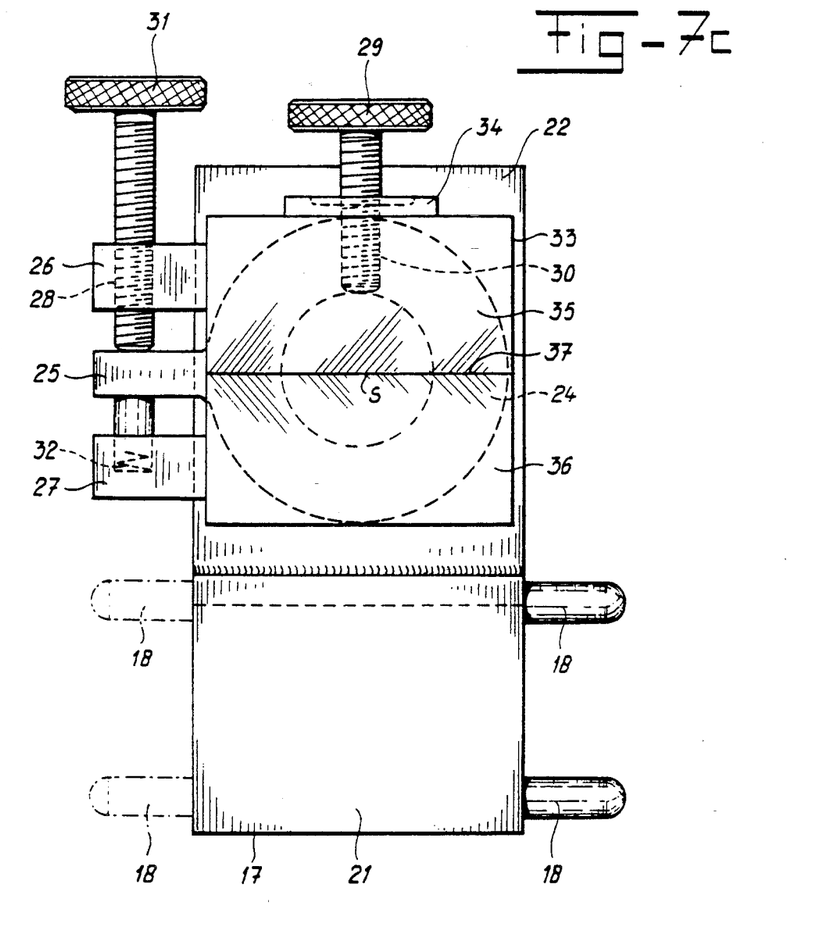

FIGS. 7a, 7b and 7c show schematically a front, top and side view respectively of an embodiment of an optical reflection instrument for use with the method according to the invention for determining the misalignment of stationary machine parts described above.

The reflection instrument is made up of an elongated rectangular carrier element 17. From a face of the carrier element 17 several legs 18 extend outwards, by means of which the carrier element can be placed on the surface of a machine part to be measured. A support 22, bearing an optically reflecting device 19 having an optically reflecting surface, extends from another face of the carrier element 17 in the direction at right angles to the legs 18. The legs 18 are arranged in pairs at each of the ends 20 and 21 of the carrier element 17. The optically reflecting device 19 is disposed at or as far as possible near the end 21. The legs 18 near the end 20 of the carrier element 17 are movable in the direction away from and towards the carrier element 17, such that the angle δ (see FIG. 3) between the reflecting surface of the optically reflecting device 19 and the axis of a particular machine part can be altered by adjusting the legs 18. A very accurate adjustment of the angle δ can be obtained by arranging the optically reflecting device 19 at one end 21 and the adjustable legs 18 at the other end 20 of the elongated carrier element 17.

In the embodiment shown, the optically reflecting device 19 is provided with a roof-shaped reflecting surface comprising two flat reflecting surfaces 35, 36 standing at an aperture angle γ to each other, which reflecting surfaces intersect each other along a straight line s 37, see also FIG. 4. The whole unit is fitted in a holder, which is provided with a levelling instrument 34 having a level tube positioned parallel with the straight line s.

To carry out the measurement according to the invention, it is necessary to put the straight line s, at which the individual flat reflecting surfaces intersect each other, into the horizontal position, using the levelling instrument 34. The support 22 is to this end provided with a rotatably mounted shaft 23 on which the optically reflecting device 19 is fixed. Provision is also made for an annular element 24, to be fixed on the shaft 23, and provided with a lip 25 projecting outwards relative to its periphery. In the fitted position, this lip 25 is situated between two opposite lobes 26, 27 projecting outwards in the same direction from the support 22. The annular element 24 is provided on the peripheral side with an internally threaded through hole 30 extending in the radial direction. The annular element 24 can be fixed on the shaft 23 by means of a locking screw 29 to be fitted in the hole 30. This means of fixing makes it possible to place the reflecting device 19 roughly in the desired position.

Fine adjustment of this position is possible by rotating the annular element 24 through moving the lip 25 between the two lobes 26, 27. For the purpose of this fine adjustment the lobe 26 is provided with an internally threaded through-hole 28, in which an adjusting screw 31 can be moved. The other lobe 27 is provided with spring means 32 acting on the lip 25, which spring means act on the lip 25 in the opposite direction to that of the adjusting screw 31. The position of the lip 25 between the two lobes 26, 27 can be altered through displacement of the adjusting screw 31.

As shown by broken lines in FIG. 7b and FIG. 7c, the carrier element 17 may be provided with further legs 18 at its face in front of and parallel with the face at which the legs 18, shown with solid lines, are arranged. This, in order to carry out the method according to the invention as illustrated in FIG. 4. With these further legs the angle δ* can be adjusted.

Figure 8:
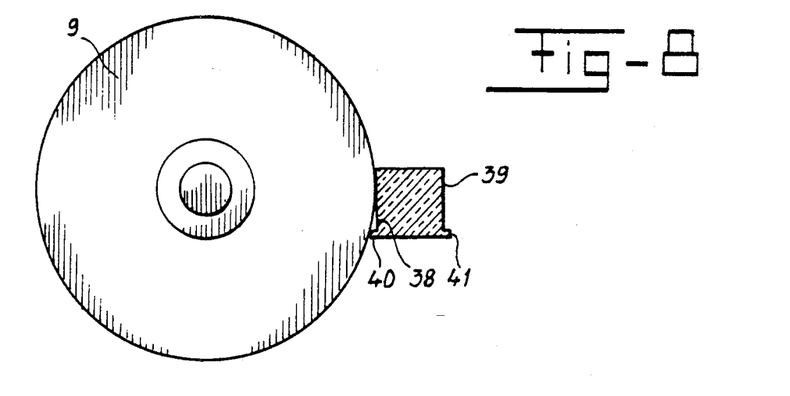
FIG. 8 shows schematically a cross-section of the preferred embodiment of the instrument according to FIGS. 7a, 7b, 7c placed on a machine part to be measured.

Instead of using legs 18, in the preferred embodiment of the reflection instrument according to the invention, the elongated carrier element 17 is provided with flat faces 38, 39 for placing the carrier element on a machine part to be measured, respectively, for example a roller 9, as illustrated in FIG. 8. By using ceramic material the faces 38, 39 can be made extremely flat. This means that the elongated carrier element can be placed with its longitudinal axis as far as possible parallel with the axis of said machine part 9. Accordingly, the angles δ and δ* as illustrated in FIG. 4, are determined by the position of the reflecting device 19, i.e. its reflecting surface, with respect to said faces 38, 39. Preferably, the reflecting surface of the reflecting device 19 is arranged at right angles to said faces 38, 39. To this end, the reflecting device 19 may be fixedly positioned on the carrier element, but is preferably adjustable in order to adjust said right angles, i.e. the angles δ and δ*.

As shown in FIG. 8, the faces 38, 39 are provided with projections 40, 41, extending in longitudinal direction of the carrier element, and having a square or rectangular cross-section. These projections 40, 41 serve as support edge for stably positioning the carrier element in tangential direction of a roller to be measured. It will be understood that for carrying out the measurement according to FIG. 3, a carrier element having one face 38, 39 and projection 40, 41 satisfies.

Ceramic material having excellent mechanical and temperature properties, such that the position of the reflecting device 19 with respect to the carrier element is accurate over a range of temperatures encompassed in practical measuring environments, can be obtained from Toto. In the preferred embodiment the dimensions of the carrier element are approximately 50 cm in length, 6 cm in width and 6 cm in thickness. The projections 40 and 41 are approximately 1 cm width and 1 cm thick.

In order to fix the reflection instrument in a stable position on a machine part to be measured, the carrier element 17 can be provided with suitable clamp means or provided with means of permanent magnetic material. In the embodiment of FIGS. 7a, 7b and 7c the legs 18 are preferably made of permanent magnetic material. In the embodiment of FIG. 8, the faces 38 and 39 may be provided with a strip of magnetic material or the like (not shown).

Although in FIGS. 7a, 7b and 7c a reflection instrument suitable for manual adjustment is shown, it will be clear that, if necessary, remote-controlled electrical devices, for example servomotors and the like, can also be used for the displacement of one or more of the legs 18 or the locking screw 29 and the adjusting screw 31. Many modifications and additions to the reflection instrument are also possible without deviating from the inventive idea on which it is based, for example putting the reflecting device in an inclined position with respect to the top face of the carrier element 17, positioning the reflecting device at and extending from the end face 21 of the carrier element 17, or the like.

We claim:

1. A method for determining from optical measurement a numerical measure of the deviation in the horizontal plane between the actual and the desired position of elongated parts (2) of a machine (1), said parts (2) having a center line or axis (M), and said machine (1) having a longitudinal axis (L), said parts (2) being disposed rotatably adjacent to each other with their axis (M) at an angle to the longitudinal axis (L) of the machine (1), using an imaginary vertical reference plane ($\Sigma$) substantially positioned at a distance from the machine (1), said reference plane ($\Sigma$) being determined by an imaginary base line ($\Gamma$) which is substantially positioned removed from and at an angle ($\mu$) relative to the longitudinal axis (L) of the machine (1), and by an optically reflecting device (5) having a reflecting surface (6) disposed in such a way that any cross-section thereof with a horizontal plane is a straight line which forms a substantially right angle with the imaginary reference plane ($\Sigma$), disposing near the axis (M) of a machine part to be measured (9) an optical measuring instrument (7) having an optically operative side (8) with a line of sight (Z), placing said measuring instrument (7) in a first position (I) in which its optically operative side (8) is directed towards the optically reflecting device (5), such that the line of sight (Z) of the measuring instrument (7) is directed substantially parallel to the imaginary reference plane ($\Sigma$), said measuring instrument (7) being an optical or electro-optical measuring instrument (7) equipped for angle measurement, and placing on the machine part (9) to be measured a further optically reflecting device (10) having a reflecting surface (11) such that the reflecting surface (11) of said further reflecting device (10) faces the measuring instrument (7) in one position wherein any cross-section of said reflecting surface (11) with a horizontal plane sets up a straight line of intersection (X) which crosses or intersects an imaginary line (m) substantially parallel to the axis (M) of the machine part to be measured (9) at an included angle ($\delta$), and placing the measuring instrument (7) in a second position (II) in which the optically operative side (8) thereof is directed towards the reflecting surface (11) of said further reflecting device (10), such that the line of sight (Z) forms a substantially right angle with the line of intersection (X), measuring an angle ($\phi$) between the line of sight (Z) in the second position (II) of the measuring instrument (7) and an arbitrary imaginary line ($\Omega$) forming an angle ($\sigma$) with the imaginary reference plane ($\Sigma$), determining a numerical measure of the misalignment representative of the deviation in the horizontal plane between the desired and the actual position, of the machine part to be measured (9) with said measured angle ($\phi$) and the other angles ($\mu$, $\delta$, $\sigma$).

2. A method according to claim 1, wherein the imaginary base line ($\Gamma$) is positioned substantially parallel to the longitudinal axis (L) of the machine (1), and the arbitrary imaginary line ($\Omega$) is selected at a substantially right angle to the imaginary base line ($\Gamma$), while the further optically reflecting device (10) with its reflecting surface (11) is placed in such a position on the machine part to be measured (9) that said line of intersection (X) crosses or intersects said imaginary line (m) substantially parallel to the axis (M) of the machine part to be measured (9), at an included angle which is substantially a right angle.

3. A method according to claim 1, wherein the imaginary base line ($\Gamma$) is positioned substantially parallel to the longitudinal axis (L) of the machine (1), and the arbitrary imaginary line ($\Omega$) is selected substantially parallel to the imaginary base line ($\Gamma$), while the further optically reflecting device (10) with its reflecting surface (11) is placed in such a position on the machine part to be measured (9) that said line of intersection (X) crosses or intersects said imaginary line (m) substantially parallel to the axis (M) of the machine part to be measured (9), at an included angle which is substantially a right angle.

4. A method according to claim 1, wherein for placing the reflecting surface (11) of the further optically reflecting device (10) at an included angle ($\delta$) which is substantially a right angle on a machine part to be measured (9), the position or misalignment of a machine part with known position or misalignment is determined by measuring under the assumption of an included right angle ($\delta$), after which the position or misalignment thus determined is compared with the known position or misalignment and, if there is an undesirable deviation, the position of said reflecting surface (11) is adapted by altering said included angle ($\delta$), the steps of measuring, determining, comparing and adapting being repeated until the determined position or misalignment corresponds substantially to the known position or misalignment, in which case the further optically reflecting device (10) with its reflecting surface (11) is set in such a way that on placing on a machine part to be measured (9) said line of intersection (X) crosses or intersects said imaginary line (m) substantially parallel to the axis (M) of the machine part to be measured (9), at an included angle ($\delta$) which is substantially a right angle.

5. A method according to claim 1, wherein said further optically reflecting device (10) has a roof-shaped reflecting surface (11) made up of two flat reflecting surfaces (12, 13) standing at an aperture angle ($\gamma$) to each other and intersecting each other along a straight line (s).

6. A method according to claim 1, wherein the further optically reflecting device (10) is placed on the machine part to be measured (9) in a second position rotated about the axis (M) of said machine part to be measured (9) relative to said one position, such that the reflecting surface (11) of said further optically reflecting device (10) faces the measuring instrument (7) and any cross-section of said reflecting surface (11) in said second position with a horizontal plane sets up a further straight line of intersection (X*) which crosses or intersects said imaginary line (m) substantially parallel to the axis (M) of the machine part to be measured (9) at a further included angle ($\delta$*) equal to the angle ($\delta$) of the line of intersection (X) in the one position, and the measuring instrument (7) is placed in a third position (III) in which the optically operative side (8) thereof is directed towards the reflecting surface (11) of said further optically reflecting device (10), such that the line of sight (Z) forms a substantially right angle with the further line of intersection (X*), and a further angle ($\phi$*) is measured between the line of sight (Z) in the third position (III) of the measuring instrument (7) and a further arbitrary imaginary line ($\Omega$*) forms an angle ($\sigma$*) with the imaginary reference plane ($\Sigma$), whereby a numerical measure of the misalignment of the machine part to be measured (9) is determined with said angles ($\phi$, $\sigma$; $\phi$*, $\sigma$*) in the one and the second position of the reflecting surface (11) of said further optically reflecting device (10) and the angle ($\mu$) between the base line ($\Gamma$) and the longitudinal axis (L) of the machine (1).

7. A method according to claim 6, wherein, prior to being placed in the third position (III) thereof, the measuring instrument (7) is moved in the direction along the base line ($\Gamma$), and the measuring instrument (7) is brought in the first position (I) wherein the line of sight (Z) of the measuring instrument (7) is directed substantially parallel to the imaginary reference plane ($\Sigma$), as a starting point for measuring with the further optically reflecting device (10) in said second position.

8. A method according to claim 7 wherein the imaginary base line ($\Gamma$) is positioned substantially parallel to the longitudinal axis (L) of the machine (1), while the arbitrary imaginary lines ($\Omega$, $\Omega$*) are selected at substantially right angles to the imaginary base line ($\Gamma$).

9. A method according to claim 7 wherein the imaginary base line ($\Gamma$) is positioned substantially parallel to the longitudinal axis (L) of the machine (1), while the arbitrary imaginary lines ($\Omega$, $\Omega$*) are selected substantially parallel to the imaginary base line ($\Gamma$).

10. A method according to claim 6 wherein said further optically reflecting device (10) has a roof-shaped reflecting surface (11) made up of two flat reflecting surfaces (12, 13) standing at an aperture angle ($\gamma$) to each other and intersecting each other along a straight line (s).

11. A method according to claim 10 wherein a precision levelling instrument is used for bringing the further optically reflecting device (10) with its straight line into a substantially horizontal position, when placing the reflecting surface (11) of said further optically reflecting device (10) into the position facing the measuring instrument (7) in which any cross-section thereof with a horizontal plane sets up a straight line of intersection (X; X*) which crosses or intersects said imaginary line (m) substantially parallel to the axis (M) of the machine part to be measured (9), at the same included angle ($\delta$; $\delta$*).

12. A method according to claim 10 wherein said further optically reflecting device (10) is fixed on the machine part (9) to be measured with its reflecting surface (11) facing the imaginary reference plane ($\Sigma$).

13. A method according to claim 1 wherein the further optically reflecting device (10) is placed on the machine part to be measured (9) in a second position rotated about the axis (M) of said machine part to be measured (9) relative to said one position, such that the reflecting surface (11) of said further optically reflecting device (10) faces the measuring instrument (7) and any cross-section of said reflecting surface (11) in said second position with a horizontal plane sets up a further straight line of intersection (X*) which crosses or intersects said imaginary line (m) substantially parallel to the axis (M) of the machine part to be measured (9) at a further included angle ($\delta$*), and the measuring instrument (7) is placed in a third position (III) in which the optically operative sight (8) thereof is directed towards the reflecting surface (11) of said further optically reflecting device (10), such that the line of sight (Z) forms a substantially right angle with the further line of intersection (X*), and a further angle ($\phi$*) is measured between the line of sight (Z) in the third position (III) of the measuring instrument (7) and a further arbitrary imaginary line ($\Omega$*) forms an angle ($\sigma$*) with the imaginary reference plane ($\Sigma$) whereby a numerical measure of the misalignment of the machine part to be measured (9) is determined with said angles ($\delta$, $\phi$, $\sigma$; $\delta$*, $\phi$*, $\sigma$*) in the one and the second position of the reflecting surface (11) of said further optically reflecting device (10).

14. A method according to claim 1 wherein the measuring instrument (7) is provided with a light beam transmitter and receiver at its optically operative side (8).

15. A method according to claim 14 wherein said light beam transmitter and receiver is a laser light beam transmitter and receiver.

16. A method according to claim 1 wherein the measuring instrument (7) is a theodolite, having a telescope provided with a horizontal and a vertical cross-wire, and the measuring instrument (7) is placed in the first (I) and second (II) positions respectively by autocollimation of the vertical cross-wire.

17. A method according to claim 6 wherein the measuring instrument (7) is a theodolite, having a telescope provided with a horizontal and a vertical cross-wire, and the measuring instrument (7) is placed in the first (I), second (II) and third (III) positions respectively by autocollimation of the vertical cross-wire.

18. A method according to claim 17 wherein said further optically reflecting device (10) is provided with a roof-shaped reflecting surface (11), comprising two flat reflecting surfaces (12) standing at an aperture angle ($\gamma$) to each other and intersecting each other along a straight line (s), and, through rotation of the machine part to be measured (9) said further optically reflecting device (10) is placed in said one and second position in which any cross-section of the further reflecting surface (11) with a horizontal plane sets up a straight line of intersection (X; X*), and the measuring instrument (7) is placed in said second (II) and third (III) positions by autocollimation with the reflecting surface (11) of said further optically reflecting device (10), in each of said second (II) and third (III) position of the measuring instrument (7), said one or second position of the further optically reflecting device (10) being determined with the aid of an uninterrupted reflected image of the vertical cross-wire from the its reflecting surface (11).

19. A method according to claim 18 wherein the angles ($\phi$; $\phi$*) to be measured for determining a numerical measure of the misalignment of the machine part to be measured (9) are determined from the average of several partial measurements.

20. An optical reflection instrument suitable for use with a method for determining from optical angle measurement a numerical measure of the deviation in the horizontal plane between the actual and the desired position of elongated parts (2) of a machine (1), said reflection instrument comprises a carrier element (17), means (18; 38, 40; 39, 41) for placing the carrier element (17) on a machine part to be measured (9), an optically reflecting device (19) movably disposed on the carrier element (17) and having a reflecting surface, and means for adjusting the position of the reflecting device (19), a support (22) extending from a face of the carrier element (17), and having a rotatable shaft (23) on which the optically reflecting device (19) is fixed; said means for adjusting the optically reflecting device (19) into a desired position including an annular element (24) adapted to be fixed on the shaft (23) and provided with a lip (25) projecting outwardly relative to its periphery, said support (22) being provided with two opposite lobes (26, 27) projecting in the same direction, in such a way that in the fitted state the lip (25) of the annular element (24) lies between the two lobes (26, 27) of the support (22), said two lobes (26, 27) being provided with means for varying the distance of the lip (25) from the two lobes (26, 27).

21. An optical reflection instrument according to claim 20 wherein a locking screw (29) is provided for fixing the annular element (24) on the shaft (23), said screw being fitted in an internally threaded hole (30) on the peripheral side of the annular element (24) so that it is displaceable in the radial direction, one lobe (26) being provided with a threaded hole (28), in which an adjusting screw (31) is disposed so that it is movable relative to the other lobe (27), said other lobe (27) being provided with spring means (32) acting on the lip (25), in such a way that the annular element (24) can be rotated by operating the adjusting screw (31).

22. An optical reflection instrument suitable for use with a method for determining from optical angle measurement a numerical measure of the deviation in the horizontal plane between the actual and the desired position of elongated parts (2) of a machine (1), said reflection instrument comprises a carrier element (17), means (18; 38, 40; 39, 41) for placing the carrier element (17) on a machine part to be measured (9), an optically reflecting device (19) movably disposed on the carrier element (17) and having a reflecting surface, and means for adjusting the position of the reflecting device (19), said carrier element being provided with projecting legs (18), wherein for placing on a machine part to be measured (9) at least one of the legs (18) is displaceable in the direction relative to the carrier element (17).

23. An optical reflection instrument according to claim 22 wherein the carrier element (17) is elongated in shape and has two ends (20, 21), two or more legs (18) being situated at each of said ends (20, 21), said legs (18) at one end (20) being movable, and said reflecting device (19) being disposed near the other end (21) of the carrier element (17).

24. An optical reflection instrument suitable for use with a method for determining from optical angle measurement a numerical measure of the deviation in the horizontal plane between the actual and the desired position of elongated parts (2) of a machine (1), said reflection instrument comprises a carrier element (17), means (18; 38, 40; 39, 41) for placing the carrier element (17) on a machine part to be measured (9), an optically reflecting device (19) movably disposed on the carrier element (17) and having a reflecting surface, and means for adjusting the position of the reflecting device (19), said carrier element (17) being elongated in shape and having at least one flat face (38;39), near and along a long edge of which a projection (40;41) is provided.

25. An optical reflection instrument according to claim 24 wherein the carrier element (17) is made of ceramic material.

26. An optical reflection instrument suitable for use with a method for determining from optical angle measurement a numerical measure of the deviation in the horizontal plane between the actual and the desired position of elongated parts (2) of a machine (1), said reflection instrument comprises a carrier element (17), means (18; 38, 40; 39, 41) for placing the carrier element (17) on a machine part to be measured (9), an optically reflecting device (19) movably disposed on the carrier element (17) and having a reflecting surface, and means for adjusting the position of the reflecting device (19), said optically reflecting device (19) being provided with a roof-shaped reflecting surface, made up of two flat reflecting surfaces (35, 36) standing at an aperture angle ($\gamma$) relative to each other and intersecting each other along a straight line (s) (37).

27. An optical reflection instrument suitable for use with a method for determining from optical angle measurement a numerical measure of the deviation in the horizontal plane between the actual and the desired position of elongated parts (2) of a machine (1), said reflection instrument comprises a carrier element (17), means (18; 38, 40; 39, 41) for placing the carrier element (17) on a machine part to be measured (9), an optically reflecting device (19) movably disposed on the carrier element (17) and having a reflecting surface, and means for adjusting the position of the reflecting device (19), said optically reflecting device (19) being made up of a holder (33) on which the reflecting surface is mounted, said holder (33) being provided with a levelling instrument (34).

28. An elongated machine part such as a cylinder or roller having two end faces, and at least one optically reflecting device (10) being fixed on an end face thereof, said optically reflecting device (10) being provided with a roof-shaped reflecting surface (11), made up of two reflecting surfaces (12, 13) which stand at an aperture angle ($\gamma$) relative to each other and intersecting each other along a straight line (s).

29. An elongated machine part according to claim 28 further including means for detecting the position at which the straight line (s) of the roof-shaped reflecting surface (11) is in the horizontal position.

30. A machine, comprising one or more elongated parts such as cylinders or rollers, wherein at least one of said parts is provided with at least one optically reflecting device (10) on an end face of said at least one part, said optically reflecting device (10) being provided with a roof-shaped reflecting surface (11) made up of two reflecting surfaces (12, 13) which stand at an aperture angle ($\gamma$) relative to each other and intersecting each other along a straight line (s).

* * * * *